US 6,697,961 B1

(12) United States Patent
Petrenko et al.

(10) Patent No.: US 6,697,961 B1
(45) Date of Patent: Feb. 24, 2004

(54) METHOD AND SYSTEM FOR DESCRIBING PREDICATES IN DISJUNCTS IN PROCEDURES FOR TEST COVERAGE ESTIMATION

(75) Inventors: Alexander K. Petrenko, Moscow (RU); Igor B. Burdonov, Moscow (RU); Alexander S. Kossatchev, Moscow (RU); Andrei V. Maximov, Moscow (RU); Juri L. Sazanov, Moscow (RU); Harry M. Sumar, Piscataway, NJ (US); Dmitri Galter, Nashua, NH (US)

(73) Assignee: Nortel Networks Limited, St. Laurent (CA)

( * ) Notice: Subject to any disclaimer, the term of this patent is extended or adjusted under 35 U.S.C. 154(b) by 570 days.

(21) Appl. No.: 09/663,726

(22) Filed: Sep. 15, 2000

(30) Foreign Application Priority Data

Sep. 17, 1999 (WO) .............................. PCT/RU99/00340

(51) Int. Cl.$^7$ .................................................. G06F 11/00
(52) U.S. Cl. ........................................... 714/26; 714/32
(58) Field of Search .............................. 714/26, 38, 39, 714/47, 32, 33, 37, 51, 43, 45; 716/2, 4

(56) References Cited

U.S. PATENT DOCUMENTS

| 4,937,765 | A | * | 6/1990 | Shupe et al. ................. 702/187 |
| 5,390,131 | A | | 2/1995 | Rohrbaugh et al. .......... 364/490 |
| 5,394,347 | A | * | 2/1995 | Kita et al. ....................... 703/2 |
| 5,604,895 | A | * | 2/1997 | Raimi ........................... 703/13 |
| 5,684,946 | A | | 11/1997 | Ellis et al. .............. 395/183.09 |
| 5,737,609 | A | | 4/1998 | Reed et al. .................. 395/704 |
| 5,758,061 | A | * | 5/1998 | Plum ............................ 714/35 |
| 5,781,720 | A | | 7/1998 | Parker et al. |
| 5,805,795 | A | * | 9/1998 | Whitten ........................ 714/38 |
| 5,860,004 | A | | 1/1999 | Fowlow et al. .............. 395/701 |
| 5,860,009 | A | | 1/1999 | Uchihira et al. ............. 395/706 |
| 5,913,023 | A | | 6/1999 | Szermer ....................... 395/704 |
| 5,974,569 | A | | 10/1999 | Nickles ......................... 714/38 |
| 6,038,396 | A | | 3/2000 | Iwata et al. .................. 395/706 |
| 6,055,370 | A | | 4/2000 | Brown et al. ................ 395/705 |
| 6,058,266 | A | | 5/2000 | Megiddo et al. ............. 395/709 |

(List continued on next page.)

FOREIGN PATENT DOCUMENTS

| EP | 0286361 A2 | 10/1988 | |
| EP | 0 406 602 A2 | 9/1991 | ........... G06F/11/00 |
| EP | 0834810 A1 | 4/1998 | |

OTHER PUBLICATIONS

"ADL 2.0 Translation System," ADL 2.0 Translation System Design Specification, Version 1.1, Online!, Aug. 7, 1998, pp. 1–132, XP002215027, http://adl.opengroup.org/documents/ADL2Ds.pdf.

(List continued on next page.)

Primary Examiner—Nadeem Iqbal
(74) Attorney, Agent, or Firm—Withrow & Terranova, PLLC

(57) ABSTRACT

To estimate test coverage of procedure testing with functional specification of a procedure, predicates in functional branches in the procedure are described as logic expressions. The logic expressions of predicates are added to logic expressions of pre-condition of the procedure. Based on the logic expressions, functions of the functional specification of the procedure are generated and coverage during the procedure testing is estimated. In an embodiment, Disjunct Normal Form (DNF) is generated using short logic which omits calculation of an operand when another operand defines the result of the calculation. In another embodiment, Full Disjunct Normal Form (FDNF) is generated using three-sign logic.

22 Claims, 8 Drawing Sheets

U.S. PATENT DOCUMENTS

| | | | |
|---|---|---|---|
| 6,212,667 B1 | 4/2001 | Geer et al. | 716/6 |
| 6,249,526 B1 | 6/2001 | Loukianov | 370/442 |
| 6,286,130 B1 | 9/2001 | Poulsen et al. | 717/4 |
| 6,301,688 B1 * | 10/2001 | Roy | 716/4 |
| 6,401,230 B1 | 6/2002 | Ahanessians et al. | 716/1 |
| 6,408,299 B1 | 6/2002 | Weerawarana et al. | 707/101 |
| 6,425,118 B1 | 7/2002 | Molloy et al. | 717/4 |
| 6,434,500 B1 | 8/2002 | Boehne et al. | 702/120 |
| 6,453,292 B2 | 9/2002 | Ramaswamy et al. | 704/235 |
| 6,463,582 B1 | 10/2002 | Lethin et al. | 717/158 |
| 6,499,114 B1 | 12/2002 | Almstead et al. | 714/25 |
| 6,510,402 B1 | 1/2003 | Logan et al. | 702/186 |

OTHER PUBLICATIONS

"Formal Derivation of Finite State Machines for Class Testing," *Lecture Notes in Computer Science*, Sep. 1998, V. 1493, pp 42–59.

"Measurement and Verification Approaches for AI Systems," http://kel3.eecs.uic.edu/USAF/appr/docappr.html, Mar. 19, 1999.

"Algebra of Normal Forms," *Summary, Journal of Formalized Mathematics*, Vol 2, Oct. 5, 1990.

"Disjunctive Constraint," http://www.ifcomputer.de/manuals/cons/node56.html.

Wing, Jeannette and Gong, Chun, "Testing and Verifying Concurrent Objects," Journal of Parallel and Distributed Computing, Academic Press, Duluth, MN, vol. 17, No. 1/2, 1993, pp. 164–182, XP000343153.

* cited by examiner

| A | B | A∧A | A | B | A∨B | A | B | A→B |
|---|---|---|---|---|---|---|---|---|
| T | T | T | T | T | T | T | T | T |
| T | F | F | T | F | T | T | F | F |
| F | T | F | F | T | T | F | T | T |
| F | F | F | F | F | F | F | F | T |

| A | B | A∧A | A | B | A∨B | A | B | A→B |
|---|---|---|---|---|---|---|---|---|
| T | T | T | T | - | T | T | T | T |
| T | F | F | F | T | T | T | F | F |
| F | - | F | F | F | F | F | - | T |

METHOD AND SYSTEM FOR DESCRIBING PREDICATES IN DISJUNCTS IN PROCEDURES FOR TEST COVERAGE ESTIMATION

This invention relates to a method and system for describing predicates in disjuncts for constructing functions for test coverage estimation of procedure testing.

BACKGROUND OF THE INVENTION

A software system contains a functionally closed set of procedures. In order to ensure correct implementation of the software system, it is desirable to determine a software contract, i.e., elements and functional specifications of external interfaces of the software system, and carry out conformance testing of the software contract implementation. Since the elements of the software contract are procedures, it is in fact Application Programming Interface (API) testing.

A kernel of an Operating System (OS) comprises API. For example, a Support Operating System (SOS) is a real-time OS for a Digital Multiplexing Switch (DMS) for a communication system. SOS comprises a plurality of processes for supporting the operation of DMS. The lowest layer of SOS is SOS kernel. The SOS kernel allocates resources to the processes running under SOS. The SOS kernel also provides communication among these processes. The SOS kernel also creates, controls and removes these processes.

SOS supports more than 25 million lines of code for applications and utilities. Thus, it is critical that user procedure interfaces of the SOS kernel be stable and reliable for correct performances of the DMS switch. The SOS kernel consists of over 1,700 procedures or over 230,000 lines of source code. Thus, it is very complicated and time consuming processes to generate a system for verifying such complex procedure interfaces. There existed no automatic or semi-automatic mechanisms to aid such generation of a verification system.

At the same time, SOS continuously evolves. Also, SOS is often ported to new hardware and software platforms. While more than 75% of the kernel procedures are machine-independent, the remainder of the kernel procedures are very machine dependent. The remainder describes particularity of memory, inter-processor communication and communication with peripheral devices. Accordingly, when SOS evolves or SOS is ported to a new platform, the SOS kernel and its procedure interfaces are also modified. Thus, the verification system for the procedure interfaces of the SOS kernel also needs to be modified. However, there existed no automatic or semi-automatic modifying mechanisms to aid such modifications.

To estimate test coverage, it is known to use Disjunct Normal Form (DNF) criterion. The DNF criterion allows estimating the number of functional branches in a procedure, i.e., the number of disjuncts in DNF. It also allows estimating conditions to follow a functional branch, depending on input parameter values and system state variables, i.e., conjunction of predicates in a disjunct.

For construction of DNF, the functional specification of a procedure is analysed as logic expression and is transformed into DNF. This method involves a problem that conventional methods of transformation of logic expression into DNF are developed only for the cases when the predicates of logic expression are independent from each other. However, in practice, the predicates, as a rule, have dependencies on each other.

There are two types of dependency. The first type of dependency exists between two predicates which cannot hold true simultaneously. The second type of dependency makes a predicate computable only when the other predicate holds a specific value, i.e., true or false. An example of the first type of dependency is the case when the first predicate is a function that holds true when its parameter is negative, and the second predicate holds true when parameter exceeds some positive value. An example of the second type of dependency is the case when the first predicate holds true when parameter i is in the range of allowable indices of some array, and the second predicate holds true when i-th element of this array is equal to some constant. In this case, if the first predicate does not hold true, then second predicate cannot be calculated at all since exception will be raised when attempting its calculation.

Such dependencies cannot be found automatically in general case by the existing method. If DNF is built without consideration of existing dependencies between predicates, a part of disjuncts will be unattainable, and estimation of test coverage will be incorrect.

In order to obtain correct test coverage estimation, DNF could be constructed manually by estimating the number of disjuncts, and then generating a procedure that calculates to which disjunct the given set of test parameters corresponds. However, manual construction of DNF involves the large effort required and tools needed to check correctness of the constructed DNF.

Another known test coverage criterion is Full Disjunct Normal Form (FDNF) criterion. The advantages of the FDNF criterion is its independence from the procedure implementation. Values of Boolean types, "true" and "false", are typically used to describe values of predicates involved in disjuncts in FDNF. To define the FDNF criterion, all disjunct of FDNF must be described. Each disjunct is equal to the conjunction of all predicates defining the functional branches of the procedure or their negations. A list of boolean values of all predicates is used as the standard form of disjunct description. However, the standard form of disjunct description can be applied only in case when all predicates can be calculated. When there are the dependencies between the predicates the value of predicates cannot be calculated and the standard FDNF criterion cannot be defined.

It is therefore desirable to provide a system and method which efficiently and correctly allow estimation of test coverage of procedure testing carried out by a verification system for procedure interfaces.

SUMMARY OF THE INVENTION

The present invention uses logic expressions of predicates in functional branches in the procedure to generate functions of functional specification of the procedure to estimate test coverage during procedure testing. In an embodiment, Disjunct Normal Form (DNF) is generated using short logic which omits calculation of an operand when another operand defines the result of the calculation. In another embodiment, Full Disjunct Normal Form (FDNF) is generated using three-sign logic.

In accordance with an aspect of the present invention, there is provided a method for estimating test coverage of procedure testing with functional specification of a procedure. The method comprises describing predicates in functional branches in the procedure as logic expressions; adding the logic expressions of predicates to logic expressions of pre-condition of the procedure; generating, based on the logic expressions, functions of the functional specification of the procedure; and estimating coverage during the procedure testing.

In accordance with another aspect of the present invention, there is provided a method for describing dependencies between predicates for construction of Disjunct Normal Form (DNF) from functional specification of a procedure for estimation of test coverage of procedure testing with functional specification of a procedure. The method comprises describing dependencies between predicates in disjuncts in the procedure as logic expressions by: determining dependencies of pairs of predicates writing dependency as implication for a pair when predicates included in the pair are dependent; and constructing conjunction of the implications.

In accordance with another aspect of the present invention, there is provided a system for describing dependencies between predicates for construction of Disjunct Normal Form (DNF) from functional specification of a procedure. The system comprises a dependency handler, a short logic calculator and a long logic calculator. The dependency handler is provided for determining dependencies of pairs of predicates in disjuncts in the procedure, and for adding logic expressions of dependencies to logic expressions of pre-condition of the procedure. The short logic calculator is provided for calculating implication as logic expression of dependency of a pair of predicates when the predicates included in the pair are dependent. The long logic calculator is provided for calculating a conjunction of the implications.

In accordance with another aspect of the present invention, there is provided a method for describing values of disjuncts in a predicate for construction of Full Disjunct Normal Form (FDNF) from functional specification of a procedure for estimation of test coverage of procedure testing with functional specification of a procedure. The method comprises building an array of description of a disjunct, the array having elements corresponding to predicates; initializing all elements in the array to indicate that values of predicates are inaccessible; calculating values of predicates which are accessible; and assigning the calculated values to elements in the array that corresponding to the accessible predicates.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

There are different kinds of API entities, such as procedures, operations, functions, methods in C++ and subroutines in Fortran. In this specification, these terms are considered synonyms and all are called "procedure".

Figure 1:
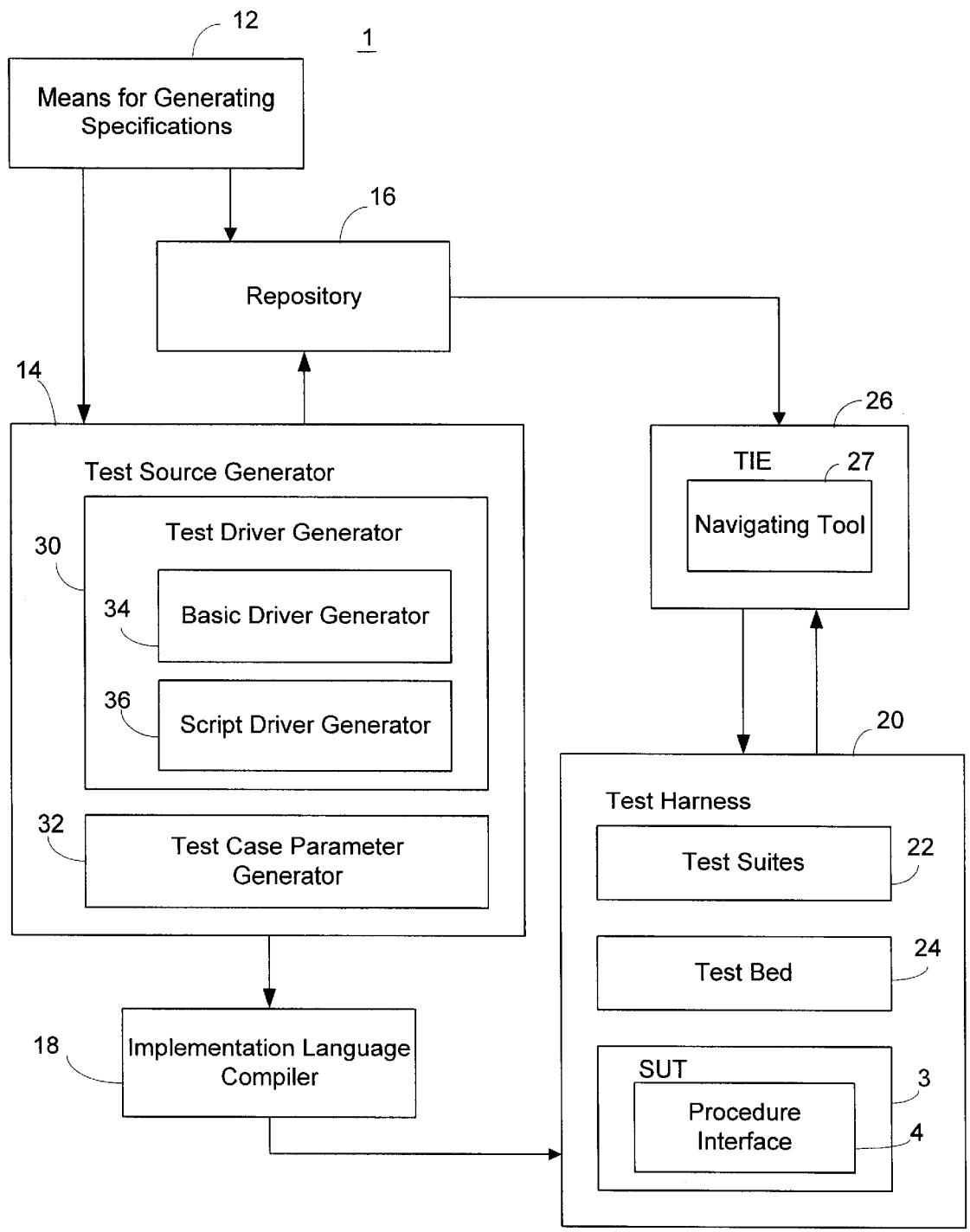
FIG. 1 is a diagram showing an example of a verification system generator to which the present invention can be used.

FIG. 1 shows an example of a verification system generator 1 to which the present invention is suitably applied. The verification system 2 is generated for verifying a procedure interface 4 of a System Under Test (SUT) 3.

Figure 2:
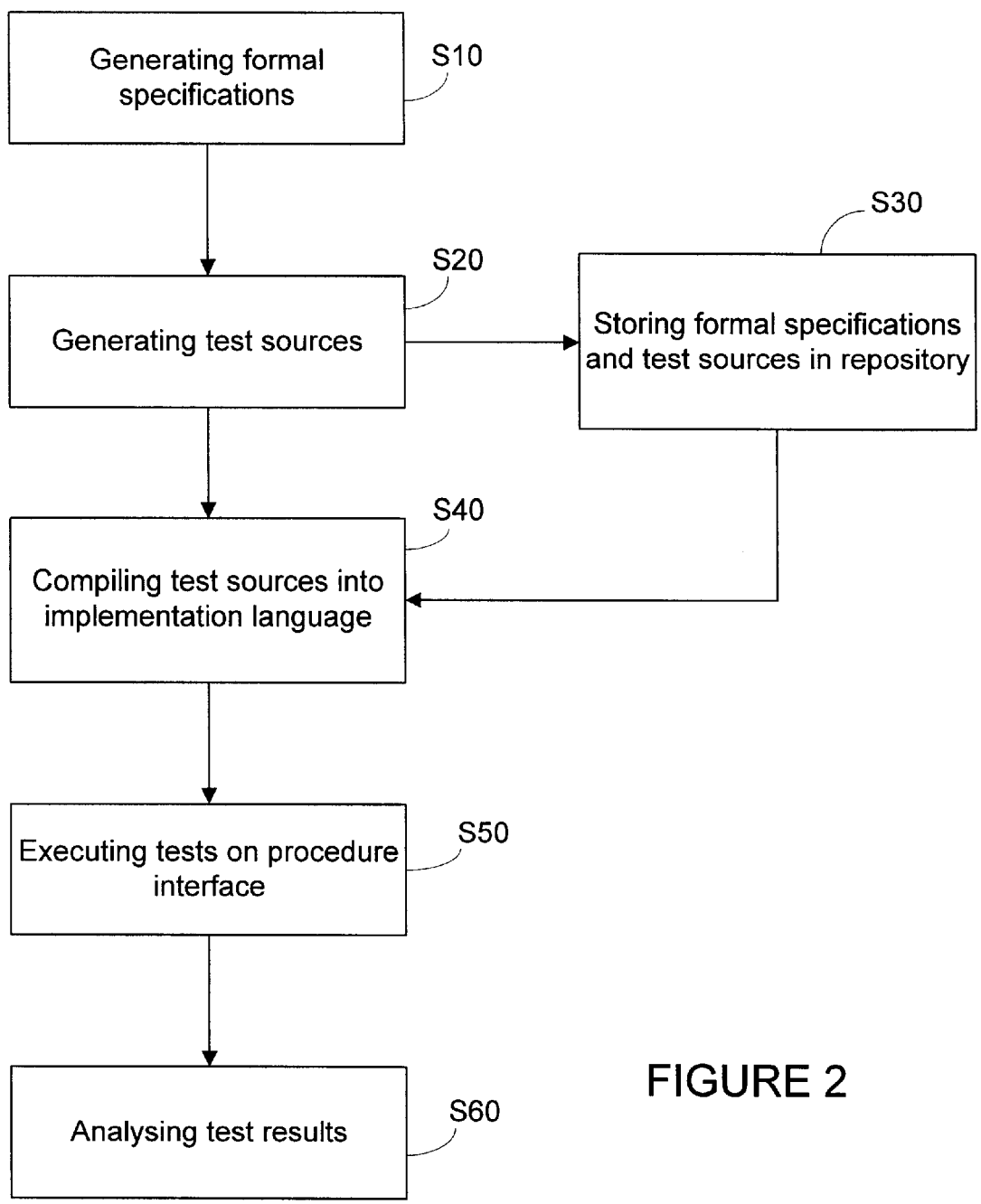
FIG. 2 is a flowchart showing a method for generating a verification system.

The verification system generator 1 comprises means 12 for generating formal specifications, a test source generator 14 and a repository 16. As shown in FIG. 2, the means 12 for generating formal specifications generates formal specifications of the procedure interface 4 (S10). Based on the formal specifications, the test source generator 14 generates test sources (S20). The generated formal specifications and the test sources are stored in the repository 16 (S30).

The test sources are used to generate a test suite 22. The test suite 22 is a set of programs and test data intended for the use in verifying the target procedure interface 4.

The formal specifications are generated in a form independent from implementation of the SUT 3. That is, the formal specifications do not depend on the implementation language, software or hardware of SUT 3, as further described later. The test sources that are generated based on the implementation independent formal specifications are also implementation independent. Accordingly, the test sources may be used on any implementation of the SUT or modified versions of the SUT.

The SUT 3 uses specific implementation language. The test sources are written in specification language that is independent from the implementation language. Accordingly, in order to execute the test sources on the SUT 3 to verify the procedure interface 4 of the SUT 3, the test sources are translated in language executable on the SUT 3 (S40). The translation is carried out by an implementation language compiler 18. The compiler 18 compiles some executable subsets of test sources in the specification language into programs in the implementation language of the SUT 3. The complied programs are specifications in implementation language that can be interpreted as description of some algorithms.

Thus, the generation of the verification system 2 is carried out in two stages. First, generation of implementation independent programs is performed. Then, implementation independent programs are compiled into those in implementation language of the SUT 3. Such a two step generation method allows the means 12 for generating specifications and the test source generator 14 of the verification system generator 1 to be implementation-independent tools and, in particular, implementation-language-independent tools.

The complier 18 may be a part of the verification system generator 1 or may be provided separately from the verification system generator 1.

The compiled test sources form the test suite 22. As the test sources are implementation independent, the test suite 22 is also independent from the implementation of the target SUT 3, other than the language used. That is, the test suite 22 does not depend on the implementation software or hardware of SUT 3. By using the test suite 22, a test harness 20 including the test suite 22 and a test bed 24 is formed for verifying the procedure interface 4 of the SUT 3, as further described below.

The test suite 22 executes tests on the SUT 3 (S50) and analyses results of the tests to verify the procedure interface 4 (S60).

The verification system generator 1 "automates" test generation of real software for verifying a procedure interface 4 of an SUT 3. The expression "automation" used herein does not necessarily mean fully automated manipulation that creates ready for use test data, test sequences and other infrastructure for test execution and test result analysis. An "automated" process may include steps of manually writing some components in implementation language. When the total size of such manually developed components is small as a whole, the process may be considered "automated".

It is preferable that the test source generator 14 comprises a test driver generator 30 and a test case parameter generator 32.

The test case parameter generator 32 generates test case parameter sources for generating test case parameters. That is, the test case parameter generator 32 generates constant arrays and programs that generate and select needed test case parameters. The test case parameters are represented by these constant arrays and programs.

Based on the formal specifications, the test driver generator 30 generates test driver sources for generating test drivers. The test drivers execute tests on the SUT 3 using the test case parameters in implementation environments and analysing results of tests.

The test drivers comprise programs to execute and control testing of the procedure interface 4. The test case parameters are parameters of a test case. A test case is an instance of a tested procedure. A test case is defined by a procedure name and its parameters, i.e., test case parameters. Also, state of environment may be a factor of defining a test case. The test drivers use the test case parameters and execute test cases on the SUT 3 to verify the procedure interface 4.

The test driver generator 30 generates the test driver sources which, once compiled into the test drivers by the implementation language compiler 18, fulfil functions to initialize the procedure interface 4, prepare input values, call tested procedures with test case parameters, and receive test procedure results and analysis of the test results. In general case, the test driver sources are complex programs.

It is preferable that the test driver generator 30 generates the test driver sources that, once compiled into the test drivers, do not only pass some previously generated test case parameters to the SUT 3, but also control the state of the SUT 3. If the SUT state violates some conditions of the test, the test drivers do not supply test parameters to the procedure interface 4.

As the formal specifications are implementation independent, the generated test driver sources and test case parameter sources are also implementation independent.

The test driver generator 30 preferably comprises a basic driver generator 34 and a script driver generator 36. The basic driver generator 34 analyses the formal specifications, and generates the basic driver sources comprising programs in implementation-independent language. The basic driver sources are used for generating a basic driver in implementation language. The basic driver is a test driver for a target procedure 4. The basic driver checks whether preconditions for the target procedure 4 hold for a given tuple of input parameters, calls the target procedure 4 with the given tuple of input parameter, records corresponding output parameters, and assigns a verdict on the correctness of the target procedure execution results. The basic driver preferably also collects information necessary to estimate test coverage or investigate reasons for a fault, as described below.

The script driver generator 36 generates script driver sources which describe sequences of calls to the basic driver with different test case parameters. The script driver sources are used for generating script drivers in implementation language. A script driver is a test driver for a target procedure or a set of target procedures. A script driver reads test options, generates sets of input parameters based on test options, and calls a basic driver with some set of input parameters. A script driver may also perform extra checking of the correctness of the target procedure execution results and assigns a verdict. A script driver may also check whether the test coverage is complete, and if not, it may continue to generate sets of input parameters and call the basic driver with this tuple.

The present invention may be suitably applied to generation of a verification system for arbitrary procedure interface of arbitrary systems. For example, the present invention is suitably applied to generate a verification system for procedure interfaces of a kernel of a Support Operating System (SOS) for a Digital Multiplexing Switch (DMS). The invention is hereinafter described mainly for verification of SOS kernel interfaces, but it is not limited to this application.

Figure 3:
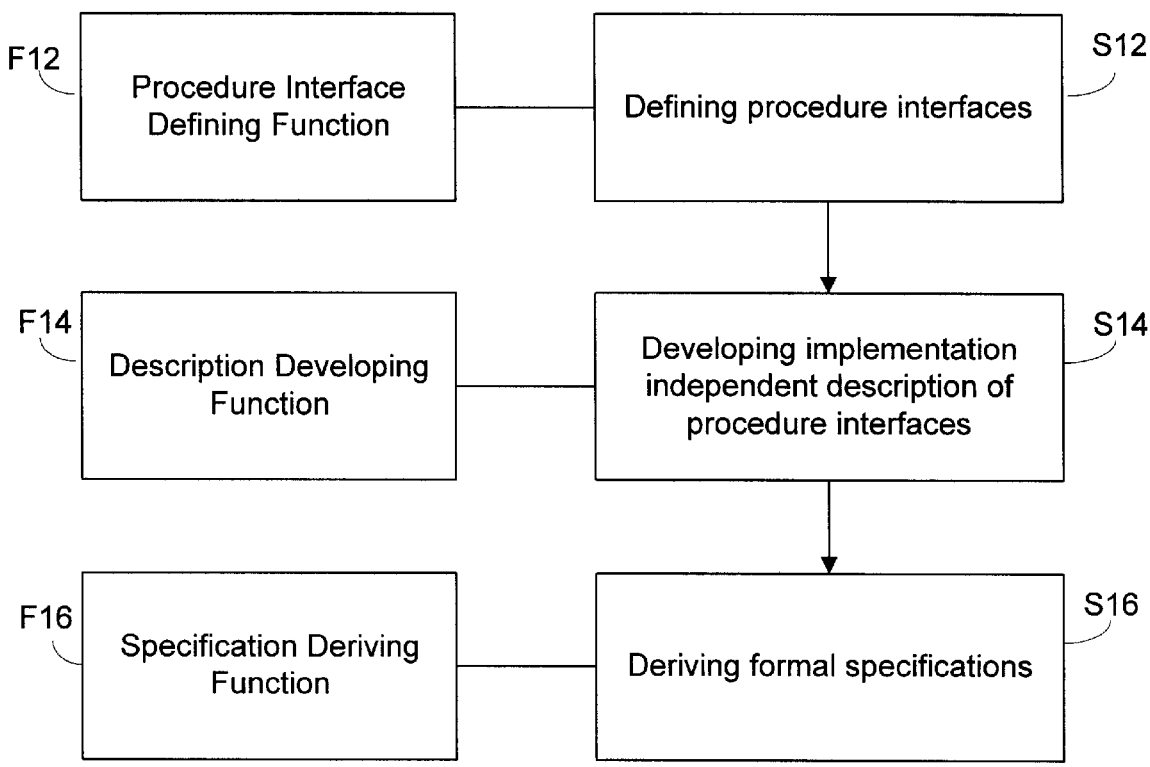
FIG. 3 is a flowchart showing steps of formal specification generation shown in FIG. 2.
Figure 4:
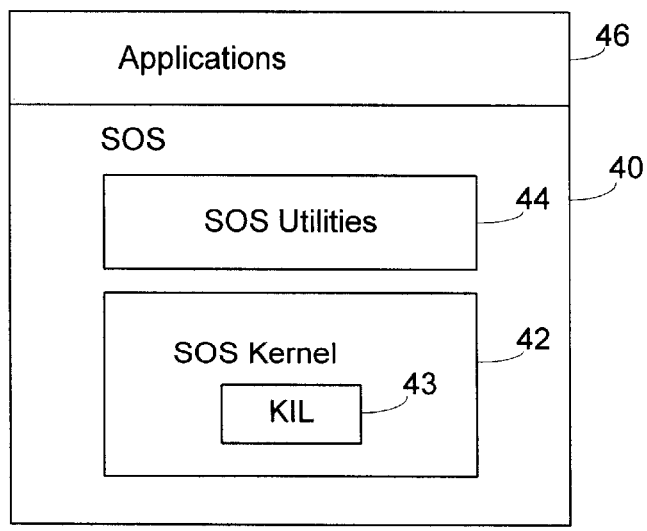
FIG. 4 is a diagram showing a structure of a Support Operation System (SOS)

The generation of the formal specifications of the procedure interfaces is further described referring to FIGS. 3 and 4.

The means 12 for generating specifications first provides a function (F12) for defining procedure interfaces of the SOS kernel (S12).

As shown in FIG. 4, SOS 40 has SOS kernel 42 and SOS utilities 44. SOS 40 supports applications 46. SOS 40 is written using Nortel Networks Corporation's proprietary programming language called Protel, which is an example of the implementation, or target, language.

The SOS Kernel 42 comprises a plurality of procedures. The procedure interface defining function (F12) categorises the procedures of the SOS Kernel 42 into two groups: one group for those depending on implementation of SOS 40, and the other group for those independent from implementation of SOS 40. The procedure interface defining function (F12) then defines procedure interfaces to consist of procedures that are implementation independent. The defined procedure interfaces form a Kernel Interface Layer (KIL). KIL 43 does not depend on implementation and, in particular, on hardware special features of SOS 40. The procedure interfaces of KIL 43 are defined such that each procedure in KIL 43 performs one and only one service. No two procedures provide the same service. Thus, KIL 43 comprises minimal and orthogonal procedures needed by upper layers of SOS 40 and applications 46. KIL 43 hides internal data structures and implementation details of the SOS kernel 42.

Based on the defined procedure interfaces of KIL 43, the means 12 for generating specifications provides a function (F14) for developing implementation independent description of the procedure interfaces of KIL 43 (S14).

The description developing function (F14) rigorously describes functionality of the procedure interfaces of KIL 43.

The implementation independent description may be developed using reverse engineering. The basic idea of the reverse engineering approach is a gradual "upwarding" of data representation in defined implementations. "Upwarding" is increasing the level of abstraction.

Figure 5:
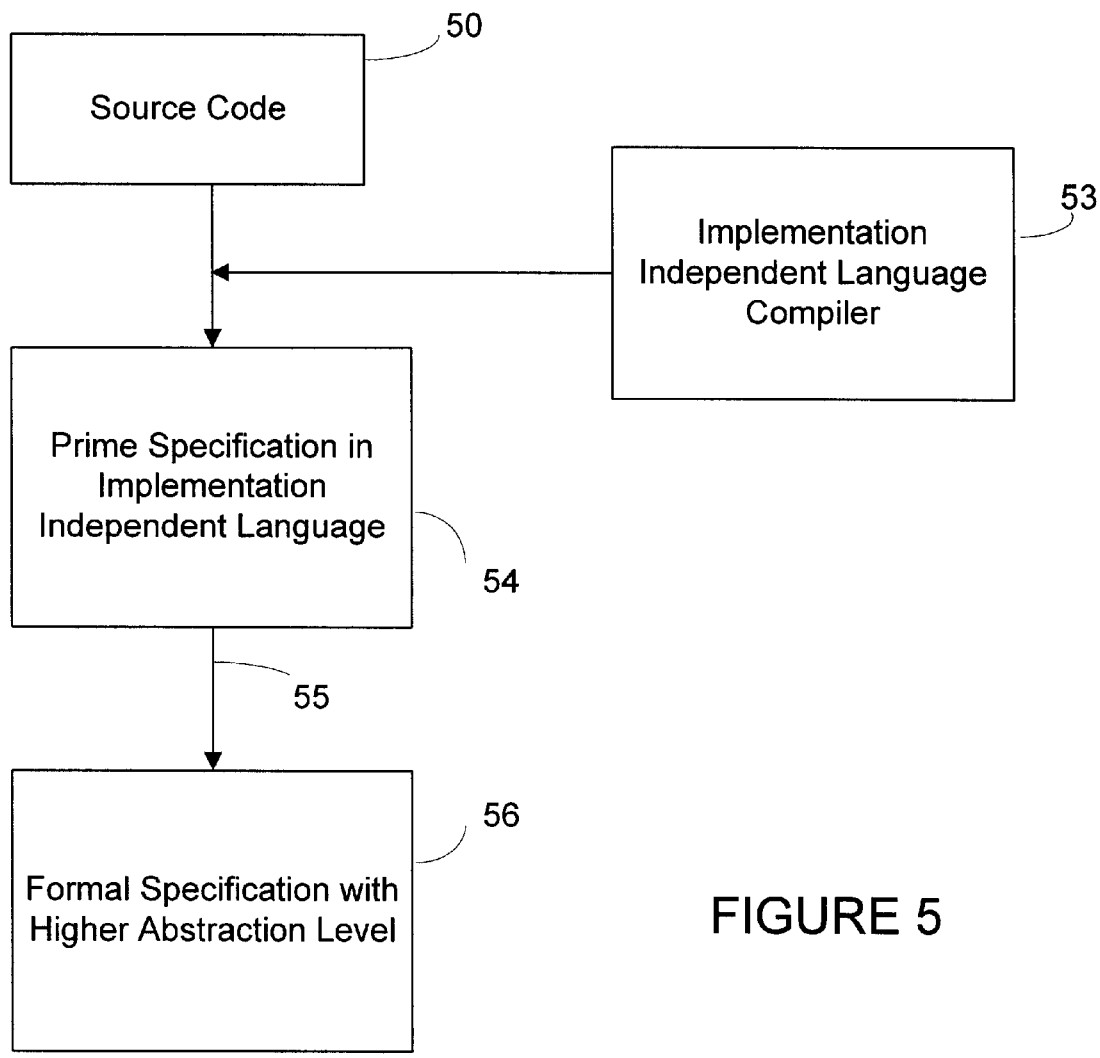
FIG. 5 is a diagram showing an example of formal specification generation.

For example, as shown in FIG. 5, it may be developed using source code 50 of the SOS kernel 42. The source code 50 is in the implementation language of SOS 40. The source code 50 is compiled into implementation independent language to generate a prime specification, i.e., implementation independent description 54. It is preferable to use an implementation independent language compiler 53 to carry out this compiling process automatically.

The implementation independent description may also be developed from documents or other information of the SOS Kernel 42.

As shown in FIG. 3, the means 12 then provides a function (F16) for deriving formal specifications of KIL 43 from the implementation independent description (S16). In the example shown in FIG. 5, the level of abstraction of the prime specification 54 is increased to generate a formal specification 56. This abstraction process 55 may be carried out manually.

It is preferable to use Rigorous Approach to Industrial Software Engineering (RAISE) to generate formal specifications. RAISE Specification Language (RSL) is suitable to write formal specifications. RSL is supported by commercial tools for syntax and semantics checking, such as an EDEN-sintaxicaly oriented editor, a RAISE to ADA compiler, and a RAISE to C++ compiler.

Other RAISE features, e.g., axiom, algebraic specifications and channels may be used in semiformal considerations and explanations.

Also, it is preferable to use model-oriented specification in implicit form as the main form of specification. The implicit form describes a target procedure using pre-conditions and post-conditions of the target procedure.

The means 12 for generating specification may comprise a tool or a set of tools for providing above described functions for aiding a specifier to manually or semi-automatically generates the specifications. An example of such tools is the implementation independent language complier 53 as described above.

It is preferable to classify procedure interfaces of the target SUT by using the specifications. The following classification of procedures of a procedure interface is suitably used for generating a verification system for the procedure interface. The procedure interface classes include five main classes of procedures and some extensions of classes including procedures tested in parallel and expected exceptions. The classes are organized hierarchically. The first class establishes the strongest requirements. Each following class weakens the requirements. The requirements for the five classes are as follows:

KIND_1: The input is data that could be represented in literal (textual) form and can be produced without accounting for any interdependencies between the values of different test case parameters. Such procedures can be tested separately because no other target procedure is needed to generate input test case parameters and analyse the outcome of the tests.

KIND_2: No interdependencies exist between the input items, i.e., values of input test case parameters. The input does not have to be in literal form. Such procedures can be tested separately. Examples of this class include procedures with pointer type input parameters.

KIND_3: Some interdependencies exist, however, separate testing is possible. Examples of this class include a procedure with two parameters in which the first one is array and the second one is a value in the array.

KIND_4: The procedures cannot be tested separately, because some input test case parameters can be produced only by calling another procedure from the group and/or some outcome of tests can be analysed only by calling other procedures. Examples of this class include a procedure that provides stack operations and that receives the stack as a parameter.

KIND_5: The procedures cannot be tested separately. Part of the input and output data is hidden and the user does not have direct access to data. Examples of this class include instances of Object-Oriented classes with internal states; and a group of procedures that share a variable not visible to the procedure user.

Exception raising extension of API classes: The specific kind of procedures raise exceptions as a correct reaction to certain input test case parameters. Examples of this class include a procedure that is supposed to raise an exception after dividing by zero. If zero received as an input parameter, then this procedure must not return any return code.

Figure 6:
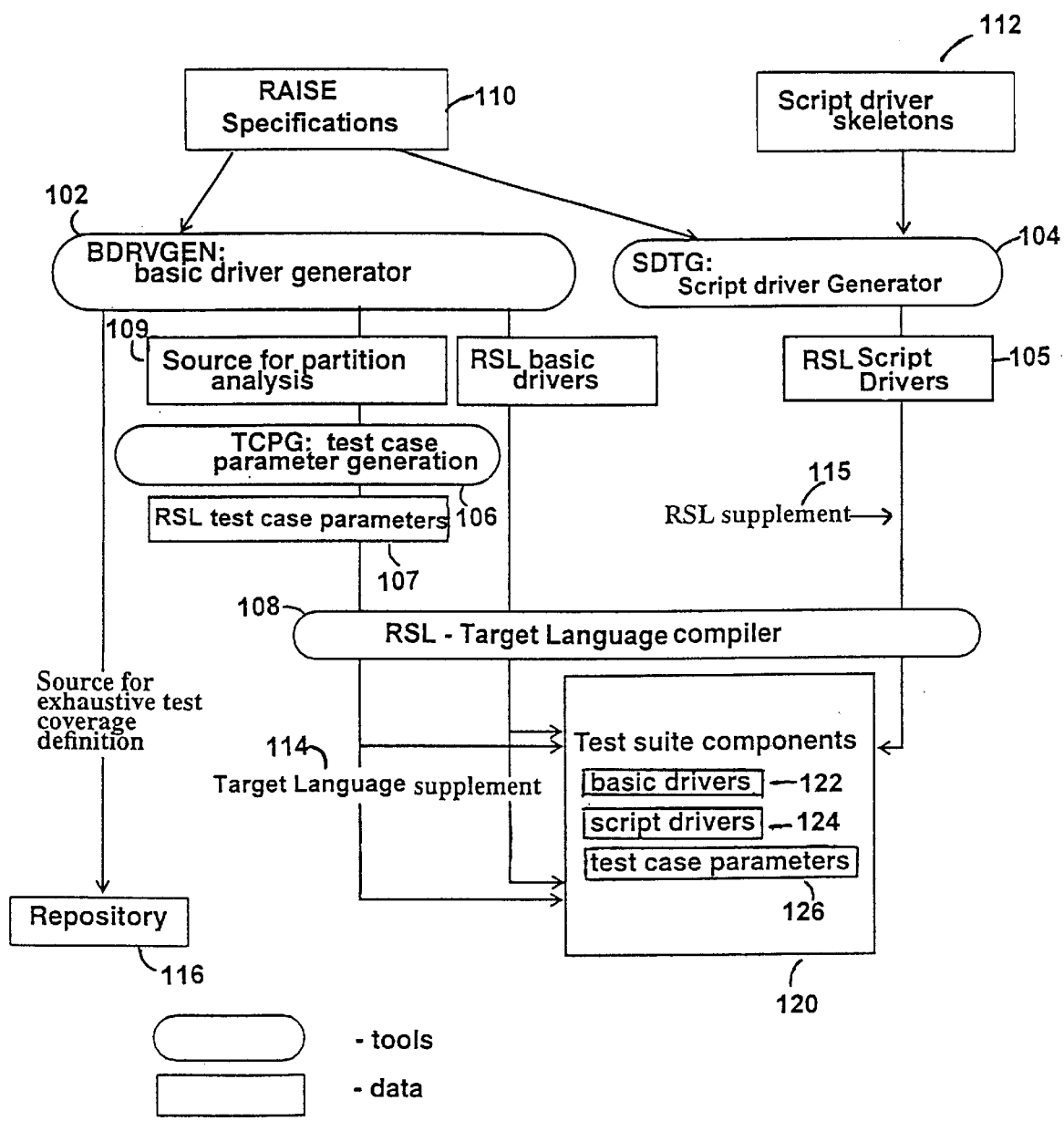
FIG. 6 is a diagram showing an example of test suite generation.

The generation of the test sources is further described referring to FIG. 6. FIG. 6 shows an example of the test generation for a KIL 43 using RAISE as implementation independent language.

The test source generator 100 comprises a basic driver generator 102, script driver generator 104 and test case parameter generator 106. In this example, the test source generator 100 uses UNIX, and the target SOS kernel 42 uses target language. The formal specifications 110 are generated in RSL. Accordingly, the test source generator 100 uses an RSL-target language complier 108 as an implementation language compiler.

The main source of the test source generation is the RAISE specifications 110. The RAISE specifications 110 are written in RSL. The RAISE specifications 110 may be those generated by the means 12 for generating specifications shown in FIG. 1 or those stored in the repository 116.

The basic driver generator 102 receives the specifications 110. The basic driver generator 102 is a tool for generating basic driver sources, i.e., RSL basic drivers 103. The RSL basic drivers 103 are testing procedures in RSL. The basic driver generator 102 executes analysis of the RAISE specifications 110. Based on the analysis results, the basic driver generator 102 generates testing procedure programs comprising the RSL basic drivers 103. That is, the basic driver generator 102 generates, as the RSL basic drivers 103, programs for checking input test case parameters, calling tested procedures, tracing and analysing the test results, assigning a verdict of the outcome, and outputting trace information.

The basic driver generator 102 preferably also generates source for test case parameter generation 109. The source 109 for test case parameter generation preferably includes source for partition analysis, as described below.

The results 103,109 of the basic driver generator 102 are fully completed in RSL sources. RSL generated sources do not require any customization as they are implementation independent.

The RSL basic drivers 103 generated by the basic driver generator 102 are compiled by the RSL-target language compiler 108 into basic drivers 122 in the target language. The basic drivers 122 comprise target language procedures. Other than the language used, the RSL basic drivers 103 and the basic driver 122 in the target language are the same.

For each procedure in KIL 43, one basic driver 122 is generated. Each basic driver 122 provides direct call of a target procedure in KIL 43, and provides common facilities to test the target procedure. That is, each basic driver 122 takes input test case parameters for KIL 43, and checks pre-conditions of the target procedure. If the pre-conditions are correct, the basic driver 122 makes the call of the target procedure, and checks post-conditions of the target procedure.

The basic drivers 122 may carry out test result analysis by recording execution outcomes and comparing them with required outcomes. The basic drivers 122 may provide the result of the analysis as a verdict. The verdict may be either "passed" or "failed". The "passed" verdict means that no error is detected. The "failed" verdict means that an error is detected.

The basic drivers 122 may have a test oracle to automatically perform the analysis of the test outcome. The test oracle is a program that assigns a verdict on the correctness of outcome for the target procedure. The test oracle is similar to post-conditions. Both the test oracle and the post-conditions have Boolean functions. They have the same parameters, and return "True" if the target procedure produces a correct result and "False" otherwise. Accordingly, the test oracles can be generated once the post-conditions are generated.

The test result may depend on the SOS state and the history of SOS functioning. In order to fulfil its function, each basic driver 122 preferably also generates programs to support a model of SOS state. The model is used to check acceptability of test case parameters in different contexts and to analyse correctness of test results.

The test case parameter generator 106 receives the source for test case parameter generation 109 from the basic driver generator 102. Then, the test case parameter generator 106 generates test case parameter sources, i.e., RSL test case parameters 107. The RSL test case parameters 107 may be constant arrays or programs. The test case parameter programs are also fully completed RSL sources.

The test case parameter generator 106 may also generate test case parameter sources from the specifications.

The RSL test case parameters 107 are compiled into test case parameters 126 by the RSL-target language compiler 108. The test case parameters 126 are input parameters for procedures under testing. Therefore, they are used for basic driver procedures. The test case parameters 126 may include only numeric and/or boolean input parameters. For example, a KIL of SOS includes about 140 procedures which need only such input parameters. These procedures are called KIND_1 procedures, as described above.

The script driver generator 104 receives the RAISE specifications 110, and generates script driver sources, i.e., RSL script drivers 105. The RSL script drivers 105 are compiled by the RSL-target language compiler 108 into script drivers 124 in the target language. Other than the language used, and the RSL script drivers 105 and the script drivers 124 in the target language are the same. The script drivers 124 are the upper level of the basic drivers 122.

Each RSL script driver 103 is a program for testing of a procedure or a group of procedures. It is a sequence of target procedure calls. The sequence may have serial or parallel composition The sequence may have iterations. The RSL script drivers 103, once compiled into the script drivers 124 by the compiler 108, realize a scenario prescript of testing.

The script driver generator 104 generates, as the RSL script drivers 105, programs to realize the sequences of procedure execution with different test case parameters. The script driver generator 104 generates the RSL script drivers 105 to have no direct interaction with target procedures. That is, the RSL script drivers 105, once compiled into the script drivers 124, call the basic driver 122. One or more RSL script drivers 105 may be written to be called by procedures which function as suppliers of test case parameters 126, or procedures that allow a system (operator to control a procedure group testing.

The script driver generator 104 may also generate programs to check the verdicts of the basic drivers 122. The script driver generator 104 may also generate programs to assign script driver own verdicts based on the basic driver verdicts.

It is preferable that the script driver generator 104 uses script driver skeletons 112 in addition to the specifications 110. The script driver skeletons 112 describe general scheme of script drivers. That is, each script driver skeleton contains an algorithm of a script driver. The script driver skeletons 112 are specific to each kind of procedure interface.

Each script driver consists of declarations and a body. The declarations include import of the procedure under test and its data structure definitions and/or import of all data and types used in the specifications. The declarations are generated automatically based on the list of procedures under test and their specifications 110. The body of a script driver begins with the script driver option parsing. The options, as parameters of the script driver as a whole, determine the depth of testing, e.g., the level of test coverage criteria, and some specific data like interval of values, duration of testing.

In the example shown in FIG. 6, in order to generate an RSL script driver 105, the script driver generator 104 uses one of the skeletons 112 and the RAISE specifications 110. Union of the specifications 110 and skeletons 112 forms formal description of test suite sources. This formal description may be considered as a test suite specification. The test suite specification allows the generator 100 to define test coverage requirements, schemes of script drivers, and algorithm for checking target procedure behaviours.

The script driver skeletons 112 for a new target SUT may be manually developed or received from the repository 116. Before testing starts, the verification system carries out some initialization. For example, before testing write/read procedures, the verification system opens a file. Such initializations are written manually. After initialization is finished, the main part of the script driver begins.

In addition to specifications 110 and skeletons 112, the script driver generator 104 may also use some supplement sources, such as some instances of test case parameters values.

The script driver generator 104 may also use procedures that convert values derived from the RAISE specifications 110 into value formats used by the current version of SOS kernel 42. Because the specifications 110 are implementation independent, correspondence between the specifications 110 and implementation data structures is separately described. Thus, it is preferable to use some means for associating abstract objects with implementation objects. Some target language procedures convert data from their representation in implementation to and from their representation in the test suite 120. Such target language procedures may be used as the associating means. The target language procedures use post-conditions of the procedure under test. The target language procedures may be manually developed.

These additional sources including manually written skeletons may be called "manually developed components". The size of manually developed components is not large compared to the automatically generated components in the verification system generator 100.

For KIND_1 procedures, full automation of test generation is possible. All other kinds generally need some additional effort for writing manually developed components. The effort gradually grows from KIND_2 to KIND_5. The extensions require more effort than the corresponding kinds themselves. Complexity and effort for the development of manually developed components is usually caused by the complexity of the script driver generation and debugging. All script drivers for different classes of procedures have similar structure. The main distinction is the distribution between automatically generated components and manually developed documents. The KIND_1 script driver is generated fully automatically, KIND_2 script driver is generated almost automatically and so on.

The scheme of a script driver is further described in more detail using an example of a KIND_5 script driver.

The KIND_5 script driver realizes a general algorithm for traversing an abstract Finite State Machine (FSM). This algorithm passes all states and all possible transitions between the states. Each transition corresponds to an execution of a procedure under test.

The algorithm of a script driver is related to the specification and does not depend on the implementation details outside the specification. The script driver algorithm does not have direct descriptions of the abstract FSM. The verification system generator 100 avoids use of direct descriptions because direct specification of the FSM requires extra efforts to generate.

Instead of a direct specification of FSM, the verification system generator 100 uses indirect, virtual representation of FSM. Such representation includes a function-observer and a function-iterator. The function-observer calculates on the fly the current state in the abstract FSM. The function-iterator selects a next procedure from the target procedure group, and generates a tuple of the input parameter values for this procedure.

The KIND_5 script driver algorithm is described in more detail. For example, a case of testing a procedure group is considered. After passing several FSM states, i.e., some target procedures have been called, the next transition is being made. This elementary cycle of testing starts by calling a function-iterator that selects the next procedure from the target procedure group, and prepares a tuple of input test case parameter values for this target procedure. If the function-iterators have managed to generate a new and correct tuple without violation of pre-conditions, then the script driver calls a corresponding basic driver with the tuple as actual test case parameters.

When the basic driver returns a verdict, the control script driver checks the verdict assigned by the basic driver. If the verdict is "False", i.e., an error has been detected, the script driver produces corresponding trace data and finishes. If the verdict is "True", i.e., the elementary test case passed, the script driver calls the function-observer. The function-observer then calculates a current state, logs the state and transition, and continues to traverse FSM.

Thus, all possible states and test the procedures with all needed sets of input parameters may be obtained. FSM is used here as a guideline to pass through all states the needed number of times.

As described above, the script drivers are preferably composed following the requirements of the corresponding skeletons. In this embodiment, overall, the verification system generator 100 uses five skeletons needed for serial testing of API KIND—1 and KIND_5 and one skeletor for parallel testing. Based on a corresponding skeleton and the list of target procedures and specifications, the verification system generator 100 generates a script driver template for each class. A KIND_1 template is a ready-to-use program. The template for the other kinds include several nests with default initiators and iterators. If a test designer does not need to add or improve anything in the nests, the template can be compiled by the RSL-target language compiler 108 and executed as a script driver 124. This situation is typical for a KIND_2 procedure interface. For other kinds, a test designer usually adds some specific initiators and iterators as RSL supplement 115. The test designer defines FSM state observer for the script drivers of KIND_4 and KIND_5.

In the generator 100, all kinds of generation by generators 102, 104, 106 produce results 103, 105, 107, 109 in RSL. This means that "front end" of specification and verification technology is implemented in implementation language independent form. All generators 102, 104, 106 can produce the components 122, 124, 126 of the test suites 120 for systems implemented in arbitrary programming languages.

Compilation of generated sources 103, 105, 107 by the RSL-target language compiler 108 may be carried out when generation of all sources 103, 105, 107 is completed. The RSL-target language compiler 108 translates executable subsets of RSL language into programs in the target language. Thus, the RSL-target language compiler 108 restricts RSL. These restrictions are typical for all RSL language compilers. For example, the RSL-target language compiler 108 does not treat explicit definitions of constants if the user does not define the concrete constant value but only defines limitations that restrict constant field of values.

The RSL-target language compiler 108 is implementation-language dependent.

The result of the RSL-target language compiler 108 is generally a group of complete target-language sections. This is a part of the target language module that consists of a few sections. For obtaining a target language program which is ready to execute, some target language sections with interface descriptions may be produced. Interfaces or behaviour of some procedures from SOS are written once and do not need to be rewritten repeatedly. The target language sections with interface descriptions may be produced manually. These target language sections may be called target language supplement 114.

In order to correctly use different generation/compiling tools, it is preferable to know interdependencies between modules of specifications and between results of generation/compiling, i.e., the target language sections, and other target language modules/sections that were manually developed or had been produced by other tools. These interdependencies may be represented by a graph. The complexity of such a graph of interdependencies depends on the size of the procedure interface under test.

For example, currently KIL consists of over 560 procedures divided into over 30 subsystems. For each subsystem, there exists, at least, a basic driver module, and as a whole there exist about 200 script driver modules. For each RSL driver, at least one target language module is generated and stored. Besides, the target language modules consist of a few sections and each section is stored in a separate file. As a whole, KIL requires over 10,000 files. In order to facilitate use of test generation/compiling tools, it is preferable to provide a work "manage" utility, as described later.

The basic drivers 122 invoked by the script drivers 124 are generated fully automatically. The only manually developed components called from basic drivers 122 are data converters of the RSL-target language compiler 108. As mentioned above, the converters transform the model data representation into the implementation representation and vice versa. A model representation is distinguished from the implementation one by the level of abstraction. For example, models may use "infinite" representation of integers, maps, relations, and other data structures suitable for specification. Sometimes model representation is very similar to the implementation one. In this case, such transformation is done by a standard translation algorithm of the specification language into the implementation language.

The verification system generator 100 is suitably used for generating a verification system for a continual evolving SUT. SOS may be evolved in accordance with its life cycle. During evolution cycle, requirements, interfaces or behaviour of some procedures from the SOS kernel, and implementation of SOS are repeatedly modified. For each new version of SOS, it is necessary to develop a new version of verification system. Therefore, it is beneficial to automate process of regeneration of the verification system.

Life cycle of test suites 120 generated by the verification system generator 100 replicates life cycle of the SOS Kernel 42. Usually, only a few interfaces or behaviour of some procedures from the SOS kernel are modified. The verification system generator 100 provides a possibility to re-specify modified interfaces or behaviour of some procedures from the SOS kernel and then re-generate test suites 120, and in doing so to provide re-use of old manually developed components. Thus, the verification system generator 100 can automate test suites regeneration. Therefore, existence of manually developed components does not decrease actual level of automation of the verification system generation.

To support automatic regeneration of test suites 120, the verification system generator 100 preferably stores in the repository 116 all manually developed components developed for generating the test suites 120 separately from automatically generated components. The manually developed components supplement automatically generated components. Therefore, process of the test suites components manually development may be called "supplement". Thus, the verification system generator 100 may use two kind of sources for generating test sources: formal specifications and some supplement sources. As automatically generated and manually developed components of the verification system generator 100 are stored separately, no manual changes in automatically generated components are needed. Therefore, the verification system generator 100 can eliminate need of customizing automatically generated files for each regeneration of the test suites 120.

To estimate effort for generating verification system, a volume of modified interfaces or behaviour of some procedures from the SOS kernel is first estimated. When no interface is modified during SOS evolution, then no test (re)generation is needed. In that case, only realization, i.e., implementation, of SOS is modified. Therefore, previous specifications 110 and previous test suites 120 can be used for validation of the new KIL.

When some interfaces or behaviour of some procedures from the SOS kernel are modified or added during SOS evolution, then corresponding specifications 110 need to be modified. When interface data structures are modified, in addition to specifications 110, some conversion procedures in the target language also need to be (re)developed. Those target language conversion procedures may be manually developed. In any case, some reasons for test plan modification may arise. For example, these modifications may be caused by wishes to increase amount of tests, decrease time of testing, to check correlation of some features for parallel execution and so on. In those cases, some manual modification to manually developed components may be needed. When manual modifications are completed, a test designer can automatically generate new test suites 120 for validation of the new SOS kernel by using the verification system generator 100.

In a simple case, it may suffice to modify the specifications 110 of types of pre-condition or post-condition of a target procedure. When new modification of procedure behaviour does not imply on behaviour of other procedure, the generator 100 needs only to regenerate a basic driver for verification of the modified procedure. In a complicated case, the generator 100 may need to regenerate totally new test suites including new basic drivers and script drivers. What volume of test suite modification is required depends on dependencies inside of the specifications 110 and between separate parts of the specifications 110 and test suites components 122–126 generated from these parts. Existing "manage" utility may be used which automates regeneration and recompiling of new test suites, as described later.

In order to port a test suite 120 generated by the verification system generator 100 from one implementation language platform to another, the data converters need to be rewritten and a new RSL to implementation language compiler needs to be provided. Also, a new run-time support system for the test suites with new test bed functions needs to be provided.

It is preferable that the verification system generator 100 also generates data for test coverage estimation and test plan design. The data is preferably kept in the repository 116.

Test coverage measures the completeness of testing. Sometimes, test coverage is presented as percentage of checked test situations. Sometimes, it is a list of test situations that have been or should be checked by the test suites. Test coverage requirements present all possible test situations that must be covered by test suites execution. If test suites 120 meet the requirements, then "exhaustive" or "100%" test coverage is gained.

There is a difference between test coverage estimation for source code and for specifications. In the case of source code, a test situation is associated with a statement, branch of path in control flow graph of a program. In the case of specifications, the specifications are represented as logical expressions, i.e., boolean expressions. Thus, test situations are associated with branches and disjuncts of boolean expressions. Therefore, by using test situations for specifications, it is possible to define test coverage requirements for arbitrary specifications. This allows uniform notation for description and accounting of the test situations, coverage requirements and obtained coverage.

The test suites are generated based on the specifications. The specifications are implementation independent. Thus, the test coverage is preferably measured by means of an implementation independent way. For this purpose, the verification system preferably uses test coverage criteria which are based on the specifications.

In complex SUTs, "all test situations" may not be covered. Accordingly, it is preferable to group similar test situations in classes. In this case, exhaustive coverage may represent coverage of all classes of test situations. Test situations and their classes may be identified and classified based on implementation source code or some external descriptions of the procedures under test. When a so-called "black box"

approach is taken to test SUTs, test situations and their classes are identified and classified based on knowledge of descriptions of the procedures under test.

The test coverage criterion is a metric defined in terms of implementation or specification. The most well known test coverage criteria in terms of implementation are:

Class 1—all statements are passed; and

Class 2—all branches are passed.

In the case of using the specifications for test coverage criteria definition, the so-called domain testing approach is preferably used. The whole input space is partitioned into areas by the basic driver generator. Each area corresponds to a class of equivalence.

The source for test case parameter generation 109 generated by the basic driver generator 102 preferably includes source for the partition analysis. The partition determines the choice of one of the test generation techniques applicable to a procedure interface or an interface of a procedure group. The source for partition analysis includes a list of test situation classes that represent test coverage requirements, and initial data for partition analysis. The source for partition analysis is used to generate test case parameters 126.

The partition may be derived from the specifications that describe requirements on input and properties of outcome for target procedures. Both the requirements and properties are represented in pre-conditions and post-conditions of formal specifications in implicit form. Accordingly, the test coverage estimation can be carried out based on the implicit specifications. In this example, the average percentage of the test coverage of the verification system generated by the generator 100 for SOS KIL is 70% to 100% of statements in the implementation.

Furthermore, there are two levels of the test coverage criteria. The first one is the coverage of all branches in post-conditions. The second one is the coverage of all disjuncts, i.e., elementary conjunctions, in the Full Disjunctive Normal Form (FDNF) representation of the post-condition while taking into account the pre-condition terms. The verification system generator 100 allows automatic partitioning in terms of specification branches and FDNF. It is preferable to calculate accessible FDNF disjuncts and remove the inaccessible FDNF disjuncts using pre-condition design, as further described below.

Monitoring of obtained test coverage is preferably conducted on the fly by script drivers 124. Based on this data, the script drivers 124 may tune testing parameters and/or testing duration.

Test Coverage Estimation Using DNF

To estimate test coverage, it is known to use Disjunct Normal Form (DNF) criterion, as described above. However, the existing DNF criterion does not provide correct estimation when predicates have dependencies on each other.

According to an embodiment of the present invention, DNF is built taking account of existing dependencies between predicates.

Referring to FIGS. 7 to 11, estimating of test coverage using DNF according to the embodiment of the present invention is described.

Figures 7, 8, 9:
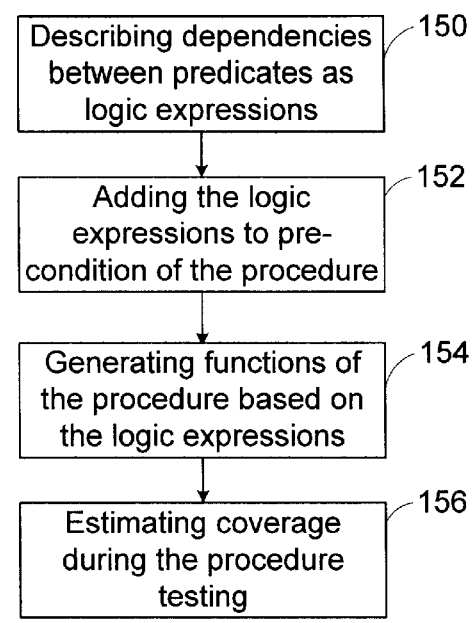
FIG. 7 is a flowchart for showing estimation of test coverage in accordance with an embodiment of the invention.
FIG. 8 is a table showing g long logic.
FIG. 9 is a table showing short logic.

As shown in FIG. 7, dependencies between predicates in functional branches or disjuncts in a procedure are described as logic expressions (150). The descriptions are added to the logic expression that describes pre-conditions of the procedure under specification (152). Based on this description, it is possible to automatically generate functions (154) to estimate coverage during procedure testing (156).

The calculation of the result of operations of disjunction, conjunction and implication may be categorised into two types of logic calculus: a long logic and a short logic.

According to a long logic, values of both operands are calculated first, and then actual result of the operation is calculated. In tabular representation, the operations of the long logic are defined by the table shown in FIG. 8.

According to a short logic, a value of the first operand is calculated first, and then if the value of the first operand completely defines the result of the operation, the calculation of value of the second operand is omitted. Otherwise, the value of the second operand is calculated, and then actual result of the operation is calculated. In tabular representation, the operations of a short logic are defined by the table shown in FIG. 9.

Figure 10:
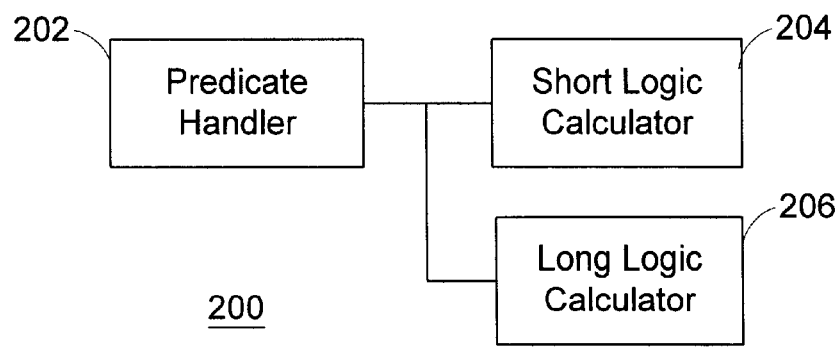
FIG. 10 is a block diagram showing a system for describing dependencies between predicates in accordance with an embodiment of the present invention.

FIG. 10 shows a system 200 for describing dependencies between predicates in accordance with an embodiment of the present invention.

The system 200 comprises a predicate handler 202, a short logic calculator 204 and a long logic calculator 206. The predicate handler 202 determines dependencies of pairs of predicates, and adds the logic expression of dependencies to pre-condition of the procedure. The short logic calculator 204 performs short logic. The long logic calculator 206 performs long logic.

Figure 11:
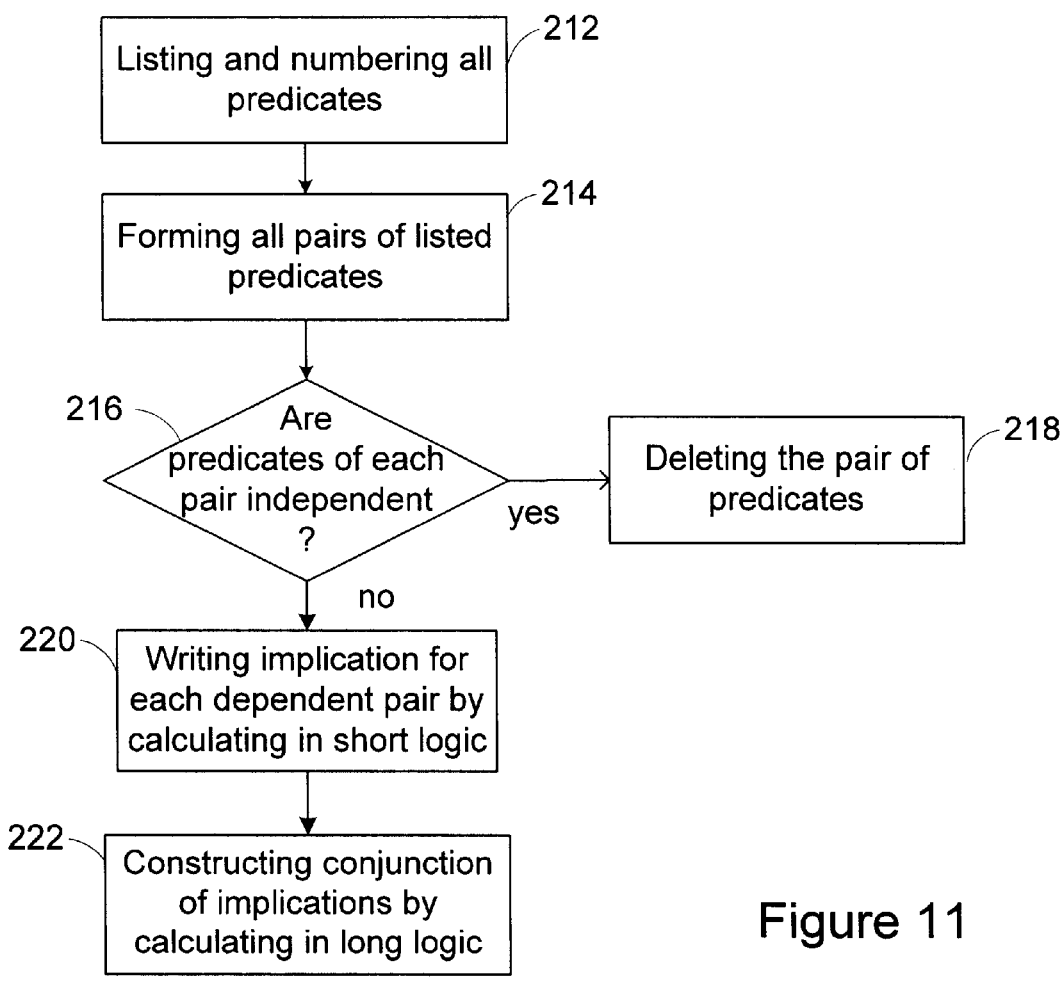
FIG. 11 is a flowchart showing a method of describing dependencies between predicates in accordance with an embodiment of the present invention.

FIG. 11 shows a method of describing dependencies in accordance with another embodiment of the present invention.

All predicates that determine functional branches of a procedure in its formal specification are listed and numbered (212). The number of a predicate is determined by its place in the specification. All pairs of listed predicates are formed such that the number of the first predicate in each pair is smaller than the number of the second one (214).

If predicates included in a pair are independent from each other(216), this pair is deleted (218).

If predicates in a pair are dependent on each other (216), this dependency is written to the pair of the predicates as implication (220). The implication is written such that validity or falsity of the first predicate implies validity or falsity of the second one. This implication is calculated in the short logic.

Then, conjunction of these implications is constructed (222). This conjunction is calculated in the long logic.

If there is a composite dependency, i.e., the validity of some logic expression of k predicates implies the validity of another logic expression of m predicates, such implication is also linked by a "long" conjunction.

Calculation of implications in short logic allows avoiding calculations of predicates in cases when the predicate is not computable. For example, if array index i is not in a range of the array indices, it is impossible to calculate the value of the predicate that has i-th element of the array as its parameter. The short logic avoids calculations of the predicate, and thus enables construction of DNF.

The descriptions of functional dependencies, which are calculated according to rules of short logic, are identically equal to true for all allowed values of input parameters of the procedure and all values of global variables used by the procedure.

Using DNF as test coverage criterion gives an optimum ratio between the number of test cases and the quality of testing. Thus, it allows to significantly reduce amount of necessary manual work compared to manual development of functions for test coverage estimates based on DNF criterion.

Estimating Test Coverage Using FDNF

Another known test coverage criterion is Full Disjunct Normal Form (FDNF) criterion, as described above. In order to define the FDNF criterion, all disjunct of FDNF must be described. However, the standard form of disjunct description can be applied only in case when all predicates can be calculated. In practice, in more than 50% of the cases, there are the dependencies between the predicates. Accordingly, it may be possible to calculate the value of some predicates only if another predicate holds a specific value, i.e., true or false.

For example, consider a case where there are two predicates in a set of the predicates defining the functional branches of a procedure. Let the first predicate depend on index i, and hold true if i belongs to the set of indices of some array, and hold false otherwise. Let the second predicate, that also depends on index i, check the equality of the value of i-th item of the array to some constant. If the value of the first predicate is false, then the second predicate can not even be calculated.

In this connection, the problem of describing the inaccessible predicates in the disjuncts of FDNF arises.

Now, if some predicates in disjuncts in FDNF can be partially calculated, i.e., they depend on values of another predicates, then another criteria of test coverage are used. The most frequently used criterion is the closest criterion of DNF. In this case, disjuncts contain only actually calculated predicates. However, the DNF criterion strongly depends on the implementation. If the implementation of a procedure calculates predicates in another order and there are some errors in control flow paths, these errors could not be found during testing using the DNF criterion.

For example, consider a case of the specification of a procedure to define New Year's gifts for co-workers. If a co-worker has a child, a gift should be a toy. If a co-worker does not have a child and he is a smoker, a gift should be a pipe. If a co-worker does not have a child and he is not a smoker, a gift should be a candy.

In the following informal predicate notation, W means a co-worker and G means a gift. DNF of the procedure is as follows:

<W has a child>∧<G is a a toy>
V<W has no child>∧<W is a smoker>∧<G is a pipe>
V<W has no child>∧<W isn't a smoker>∧<G is a candy>

FDNF of the procedure is as follows:

<W has a child>∧<W is a smoker>∧<G is a toy>
V<W has a child>∧<W isn't a smoker>∧<G is a toy>
V<W has no child>∧<W is a smoker>∧<G is a pipe>
V<W has no child>∧<W isn't a smoker>∧<G is a candy>

During creation of test cases for the procedure based on DNF, one test case for each disjunct is obtained. The first disjunct does not depend on W being a smoker or not. Accordingly, a smoker with a child can be chosen as a test case for the first disjunct.

Let the procedure itself be implemented as follows:

IF<W is a smoker>
THEN IF<W has no child>
 THEN<G is a pipe>
 ELSE<G is a toy>
ELSE<G is a candy>

This implementation has an error. That is, a gift for non-smoker with a child should be a toy, but the above implementation indicates a candy. However, if a smoker with a child is used as a test case for a first disjunct in DNF, a test case for a non-smoker with a child will never be run, and thus the test will never detect this error in the implementation.

In order to avoid such an error, according to another embodiment of the present invention, three-sign logic is used to describe the values of predicates involved in the disjuncts in FDNF.

The three-sign logic adds a new value "undefined" to the set of values of the standard boolean type having two values "true" and "false". This set of values is used to describe the value of predicates which can not be calculated if other predicates have given values.

The description of a disjunct is an array with the size equal to the number of predicates defining functional branches of the procedure. The value of the i-th element of the array corresponds to the value of the i-th predicate. If a predicate is accessible, i.e., its value can be calculated, then the corresponding element of the array is assigned the value of "true" or "false". If the predicate is inaccessible, i.e., its value can not be calculated, then the corresponding element of the array is assigned the value of "undefined".

Figure 12:
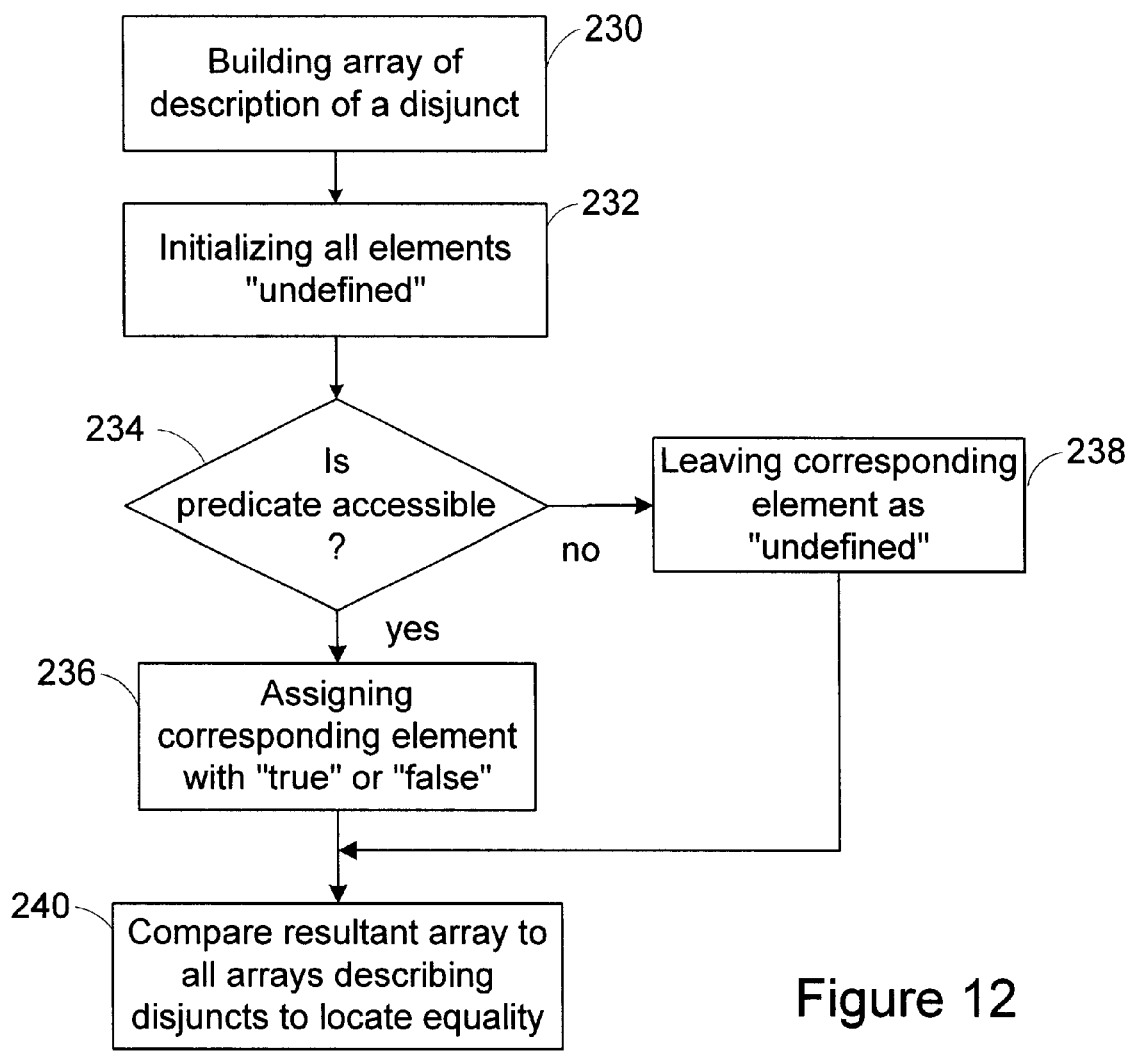
FIG. 12 is a flowchart showing a method of describing values of predicates in accordance with another embodiment of the present invention.

As shown in FIG. 12, the function of mapping disjunct in FDNF for given test parameter set builds the array (230), and initializes all elements to "undefined" (232).

Then, the function calculates the values of all predicates that can be calculated, and assigns calculated values to the corresponding elements. That is, if a predicate is accessible, then the corresponding element of the array is assigned the value of "true" or "false" (236). If the predicate is inaccessible, the corresponding element of the array is unchanged and stays as "undefined" (238).

The obtained array can be compared to all disjunct descriptions, i.e., all arrays describing disjuncts (240). The equality of the obtained array to the array describing some disjunct means that the test parameter set will test the disjunct. The equality is used to calculate coverage criterion.

The criterion using the three-sign logic may be called an Accessible Full Disjunct Normal Form (AFDNF) criterion.

By using the three-sign logic, it is possible to use the FDNF criterion for all procedures under test. It increases the quality of testing and, by doing so, decreases the efforts for software maintenance.

While particular embodiments of the present invention have been shown and described, changes and modifications may be made to such embodiments without departing from the true scope of the invention. For example, the present invention is described mainly using the verification system generator for verifying the SOS kernel. However, the present invention is suitably used for verifying a different system, such as a base level of call processing system, and a management system of tree-like store for queues with different disciplines. The present invention is mainly disclosed using RSL specifications. However, natural language documentation may also be used. Also, the present invention is mainly disclosed using UNIX. However, other operating systems may also be used.

What is claimed is:

1. A method for estimating test coverage of procedure testing with a functional specification of a procedure, the method comprising steps of:
   describing predicates in functional branches of the procedure as logic expressions by calculating the logic expression of dependencies using short logic which omits calculation of an operand when another operand defines the result of the calculation;
   adding the logic exsspressions of predicates to logic expressions of at least a pre-condition of the procedure;
   generating, based on the logic expressions, functions of the functional specification of the procedure; and
   estimating coverage during the procedure testing.

2. The method as claimed in claim 1, wherein
   the step of generating automatically generates Disjunct Normal Form (DNF).

3. The method as claimed in claim 1, wherein the step of describing describes values of the predicates using three-sign logic; and the step of generating automatically generates Full Disjunct Normal Form (FDNF).

4. A method for constructing Disjunct Normal Form (DNF) from a functional specification of a procedure for estimation of test coverage of procedure taking with the functional specification of the procedure, the method comprising the steps of:

describing dependencies between predicates in disjuncts in the procedure as logic expressions by calculating the logic expression of dependencies using short logic which omits calculation of an operand when another operand defines the result of the calculation;

adding the logic expressions of dependencies to logic expressions of at least a pre-condition of the procedure; and generating, based on the logic expressions, the DNF of the functional specification of the procedure.

5. The method as claimed in claim 4, wherein the step of describing comprises steps of:

determining dependencies of pairs of predicates;

writing dependency as implication for a pair when predicates included in the pair are dependent; and constructing conjunction of the implications.

6. The method as claimed in claim 5, wherein the step of writing comprises a step of calculating the implication in short logic which omits calculation of one predicate when another predicate defines the result of the calculation.

7. The method as claimed in claim 5, wherein the step of constructing comprises a step of calculating the conjunction in long logic which calculates values of both predicates.

8. The method as claimed in claim 5, wherein the step of describing further comprises a step of linking implication of a composite dependency by a long conjunction.

9. The method as claimed in claim 5, wherein the step of describing further comprises a step of deleting a pair when predicates included in the pair are independent.

10. A method for describing dependencies between predicates for construction of Disjunct Normal Form (DNF) from a functional specification of a procedure for estimation of test coverage of procedure testing with the functional specification of a procedure, the method comprising steps of:

describing dependencies between predicates in disjuncts in the procedure as logic expressions by
determining dependencies of pairs of predicates;
writing dependency as implication for a pair when predicates included in the pair are dependent; and
constructing conjunction of the implications.

11. The method as claimed in claim 10, wherein the step of writing comprises a step of calculating the implication in short logic which omits calculation of one predicate when another predicate defines the result of the calculation.

12. The method as claimed in claim 10, wherein the step of constructing comprises a step of calculating the conjunction in long logic which calculates values of both predicates.

13. A system for describing dependencies between predicates for construction of Disjunct Normal Form (DNF) from a functional specification of a procedure, the system comprising:

a dependency handler for determining dependencies of pairs of predicates in disjuncts in the procedure, and for adding logic expressions of dependencies to logic expressions of precondition of the procedure;

a short logic calculator for calculating implication as logic expression of dependency of a pair of predicates when the predicates included in the pair are dependent; and a long logic calculator for calculating a conjunction of the implications.

14. The system as claimed in claim 13, wherein the short logic calculator calculates the implication in short logic which omits calculation of one predicate when another predicate defines the result of the calculation.

15. The system as claimed in claim 13, wherein the long logic calculator calculates the conjunction in long logic which calculates values of both predicates.

16. The system as claimed in claim 13, wherein the long logic calculator further calculates long conjunction to link implication of a composite dependency.

17. The system as claimed in 13, wherein the dependency handler deletes a pair when predicates included in the pair are independent.

18. A method for constructing Full Disjunct Normal Form (FDNF) from a functional specification of a procedure, the method comprising steps of:

describing values of predicates using three-sign logic as logic expressions of predicates in disjuncts in a procedure, the three-sign logic including a value indicating a value of a predicate which is inaccessible;

adding the logic expressions of predicates to logic expressions of precondition of the procedure; and generating, based on the logic expression, the FDNF of the functional specification of the procedure.

19. The method as claimed in claim 18, wherein the describing step comprises steps of:

determining if predicates are accessible;

assigning the value indicating an inaccessible predicate to inaccessible predicates;

calculating values of accessible predicates; and assigning the calculated values to description of the accessible predicates.

20. The method as claimed in claim 19, wherein the describing step flyer comprises a step of comparing the resultant array to arrays describing disjuncts to locate equality of elements to calculate coverage criterion.

21. A method for describing values of disjuncts in a predicate for construction of lull Disjunct Normal Form (FDNF) from functional specification of a procedure for estimation of test coverage of procedure testing with functional specification of a procedure, the method comprising steps of:

building an array of description of a disjunct, the array having elements corresponding to predicates;

initializing all elements in the array to indicate that values of predicates are inaccessible;

calculating values of predicates which are accessible; and assigning the calculated values to elements in the array that correspond to the accessible predicates.

22. The method as claimed in claim 21 further comprising a step of comparing the resultant array to arrays describing disjuncts to locate equality of elements to calculate coverage criterion.

* * * * *